Figure 1:
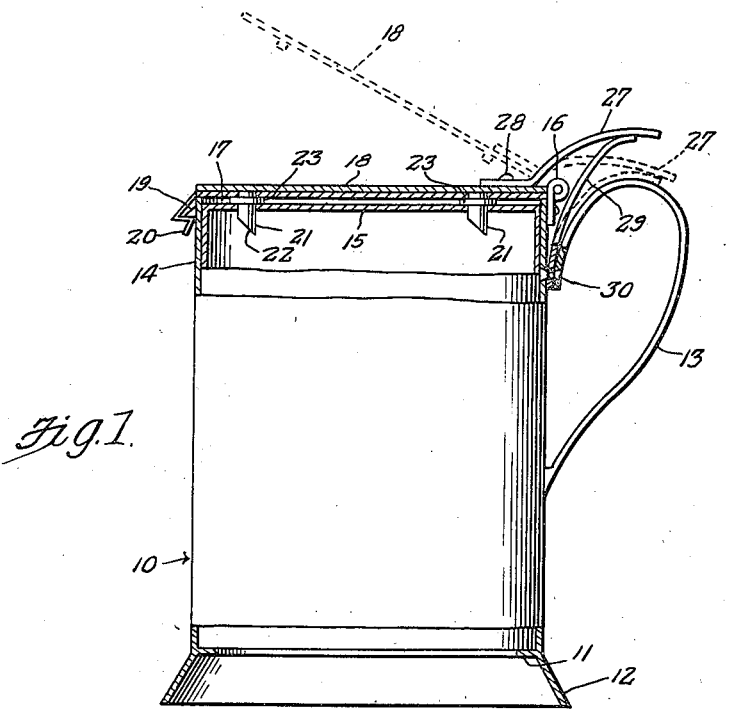

March 28, 1950        J. K. BOAK        2,501,653
MILK CAN OPENER AND CONTAINER HAVING
TWO LIDS AND ADJUSTABLE STOP MEANS
LIMITING THE OPENING OF THE LIDS
Filed March 23, 1945

Inventor
Jackson Keating Boak.

By *Clarence A. O'Brien and Harvey B. Jacobson*
Attorneys

Patented Mar. 28, 1950

2,501,653

UNITED STATES PATENT OFFICE 2,501,653

MILK CAN OPENER AND CONTAINER HAVING TWO LIDS AND ADJUSTABLE STOP MEANS LIMITING THE OPENING OF THE LIDS

Jackson Keating Boak, Camden, Tenn.

Application March 23, 1945, Serial No. 584,349

4 Claims. (Cl. 222—83.5)

This invention relates to a milk can opener and container, and more particularly to such a device adapted for use with condensed milk cans of conventional size.

A primary object of this invention is the provision of an improved device adapted to serve as a container for such cans, provided with a handle to facilitate pouring therefrom, and having integral means in association therewith for opening the can when the same is positioned within the container.

A further object of the invention is the provision of such a device provided with a double lid wherein the can may be retained securely in the container, and whereby the upper lid may be opened to facilitate the pouring of the contents of the can, as desired.

A still further object of the invention is the provision of means in association with the lower lid for perforating the can to permit access to the contents thereof, and means in association with the upper lid for closing such perforations when the upper lid is closed. An additional and more specific object of the invention is the provision of spring means biasing the upper lid into normally closed position.

A still further object of the invention is the provision of means operable by said spring means to close the container, pivotally mounted on the upper lid, in such manner that the same may be readily rotated out of the way to permit the insertion of a fresh can in the container when desired.

A still further object of the invention is the provision of such a device which will be sturdy and durable in construction, reliable and efficient in operation, and relatively simple and inexpensive to manufacture and assemble.

Other objects will in part be obvious and in part be pointed out as the description of the invention proceeds, and shown in the accompanied drawing, wherein there is disclosed a preferred embodiment of this inventive concept.

Figure 3:
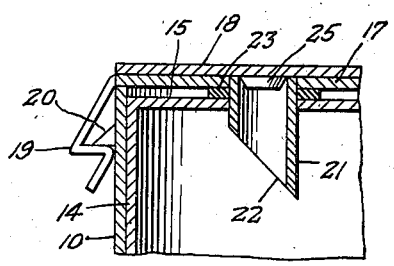
Figure 2:
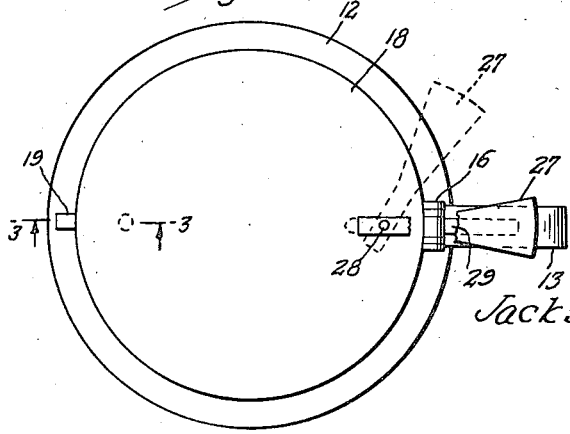

In the drawings:

Figure 1 is a side view, partially in elevation and partially in section, showing a preferred form of this invention, Figure 2 is a top plan view of the device shown in Figure 1, the lids being shown in closed position, and certain portions of the mechanism shown in different positions of adjustment by dotted lines, and Figure 3 is an enlarged sectional view taken substantially along the line 3—3 of Figure 2, as viewed in the direction indicated by the arrows.

Similar reference characters refer to similar parts throughout the several views of the drawing.

Having reference now particularly to Figure 1, there is generally indicated at 10 a cylindrical container of a dimension adapted to hold a conventional size condensed milk can. The base of the container is open, and provided with a flange 11, upon which the lower extremity of the can is adapted to rest, and an outwardly flared supporting portion 12, to enhance the appearance of the article. A handle 13 is secured to the container 10 in any desired manner. A can 14 provided with an imperforate lid 15 is adapted to be positioned within the container. A double hinge 16 is provided at a suitable point on the container, and has mounted for swinging thereon an inner lid 17 and an outer lid or cover 18. A spring catch 19 adapted to engage a suitable projection 20 on the wall of the container 10 is secured to the inner lid 17 and serves to hold the same normally in closed position. The inner lid 17 is provided with a pair of spaced tubular projections 21, each provided with a beveled cutting edge 22, adapted to perforate spaced apertures in the can lid 15, one serving as a pouring aperture, and the other as an air inlet. Sealing gaskets 23 are positioned about each of the tubes 21.

The upper lid 18 is provided with projecting portions 25, spaced to register with the upper extremities of the tube 21, and serve as closure members therefor when the upper lid is in closed position.

The outer cover 18 is provided with a thumb lift member 27, for swinging the lid open around pivot 16. This thumb lift is pivotally secured to the lid 18, as on a pivot 28, at a point adjacent the hinge 16. As best shown in Figure 1, the thumb lift portion 27 is arcuate in configuration, and extends upwardly to a point above the extremity of the handle 13. A leaf spring 29 has one end secured to the container, as by means of a rivet 30, which may also comprise the securing means for one end of the handle 13, and abuts, with its free end, the underside of the thumb lift portion 27 in such manner as to bias the lid 18 in normally closed position.

From the foregoing, the operation of the device should now be readily understandable. When it is desired to insert a can of condensed milk, or the like, in the container, the thumb lift member 27 is rotated sideways about the pivot 28 in such manner as to permit the complete raising of both lids 18 and 17 around hinge 16. A can is then inserted in the container until its base rests on the flange 11. The lower lid 17 is then closed, and pressure exerted thereon to force the tubular members 21 to perforate the lid 15 of the can to form suitable pouring and ventilating apertures. At the termination of this operation, the spring catch 20 securely holds the inner lid 17 in position. The spring 29, biasing the upper lid 18 to closed position, serves normally to protect the contents of the can. When it is desired to pour the contents of the can, it is simply necessary to depress the thumb lift 27, thus opening the upper lid 18, pour the contents or any desired quantity thereof from the can, and release the thumb lift, whereupon the spring 29 re-closes the device.

From the foregoing, it will now be seen that there is herein provided a device accomplishing all of the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A container for canned articles comprising an inner lid, an outer lid, a common hinge for swingingly securing both of said lids to the container, tubular can perforating members carried in sealing gaskets by said inner lid, closure members carried by said outer lid for closing said tubular members when the lids are simultaneously closed, a spring catch holding said inner lid in closed position independent of the outer lid and mounted on the container at the edge of the inner lid opposite to said hinge, a spring biased thumb lift on said outer lid adjacent said hinge for opening said outer lid, a handle on said container normally beneath said lift and comprising a stop for said lift and normally limiting the opening of the upper lid, said lift being pivotally secured to said outer lid to allow shifting of the lift laterally of and out of engagement with said handle to permit insertion and removal of cans from said container.

2. A receptacle for removably receiving a can of milk comprising a vertically disposed cylindrical container, spring biased inner and outer lids hinged to said container for movement about a single horizontal axis, means to puncture the top of a can secured to said inner lid, a lift pivoted on said outer lid for movement about a vertical axis, a stop on the container, said lift being depressible against said stop to open said outer lid for pouring when the lift is in one position and depressible to a greater extent when pivoted about said vertical axis into a second position to allow opening of both lids so that a can may be inserted into and removed from said container.

3. A receptacle according to claim 2 and wherein said stop comprises a handle on the container.

4. A receptacle according to claim 3 and wherein said inner lid has releasable lock means for normally holding said inner lid in closed position.

JACKSON KEATING BOAK.

REFERENCES CITED

The following references are of record in the file of this patent:

UNITED STATES PATENTS

| Number | Name | Date |
|---|---|---|
| 489,923 | Boulter | Jan. 17, 1893 |
| 592,012 | Lewis | Oct. 19, 1897 |
| 654,795 | Kidder | July 31, 1900 |
| 979,072 | Javins | Dec. 20, 1910 |
| 1,060,258 | Javins | Apr. 29, 1913 |
| 1,295,425 | Brown | Feb. 25, 1919 |
| 1,475,903 | Urtasun | Nov. 27, 1923 |
| 1,526,342 | Jones | Feb. 17, 1925 |
| 1,745,456 | Shuler | Feb. 4, 1930 |
| 2,040,087 | Hackl | May 12, 1936 |
| 2,249,918 | Sprout | July 22, 1941 |